United States Patent [19]
Boone

[11] Patent Number: 5,318,608
[45] Date of Patent: Jun. 7, 1994

[54] CARBURETOR AIR FILTER

[75] Inventor: Frank J. Boone, Owensboro, Ky.

[73] Assignee: Better Ideas, Inc., Owensboro, Ky.

[21] Appl. No.: 113,674

[22] Filed: Aug. 31, 1993

[51] Int. Cl.⁵ ............................................ B01D 46/02
[52] U.S. Cl. ................................. 55/385.3; 55/485; 55/493; 55/498; 55/528; 55/DIG. 13
[58] Field of Search ..................... 55/385.3, 483, 485, 55/493, 498, 503, 528, DIG. 13

[56] References Cited

U.S. PATENT DOCUMENTS

| | | | |
|---|---|---|---|
| 3,143,997 | 8/1964 | Norberg et al. | 55/DIG. 13 X |
| 3,722,186 | 3/1973 | Parker et al. | 55/498 X |
| 4,014,796 | 3/1977 | Sugiyama et al. | 55/498 X |
| 4,631,077 | 12/1986 | Spicer et al. | 55/DIG. 13 X |

Primary Examiner—Charles Hart
Attorney, Agent, or Firm—Jacobson, Price, Holman & Stern

[57] ABSTRACT

A supplemental cylindrical air cleaner or filter is provided for the inlet snorkel of a conventional automotive air cleaner housing and the supplemental air filter or cleaner incorporates a molded body of open cell material with said body including two elongated, upwardly opening semi-cylindrical halves including opposite side upper marginal edges with said halves disposed in side-by-side juxtaposed position with adjacent upper marginal edges of adjacent halves integrally formed and joined by a living hinge portion of said material extending therealong. The cylindrical halves include integral partitions or disks spaced therealong and projecting outwardly from the open sides of the halves with the partitions of one of the halves staggered relative to the partitions of the other half. The open sides of the halves are swung toward each other about the living hinge to form a peripherally continuous tubular member insertable into the aforementioned inlet snorkel with those portions of the partitions projecting outwardly of the open side of each half snugly received in and including marginal contours conforming to the inside cross sectional shape of the other half.

10 Claims, 1 Drawing Sheet

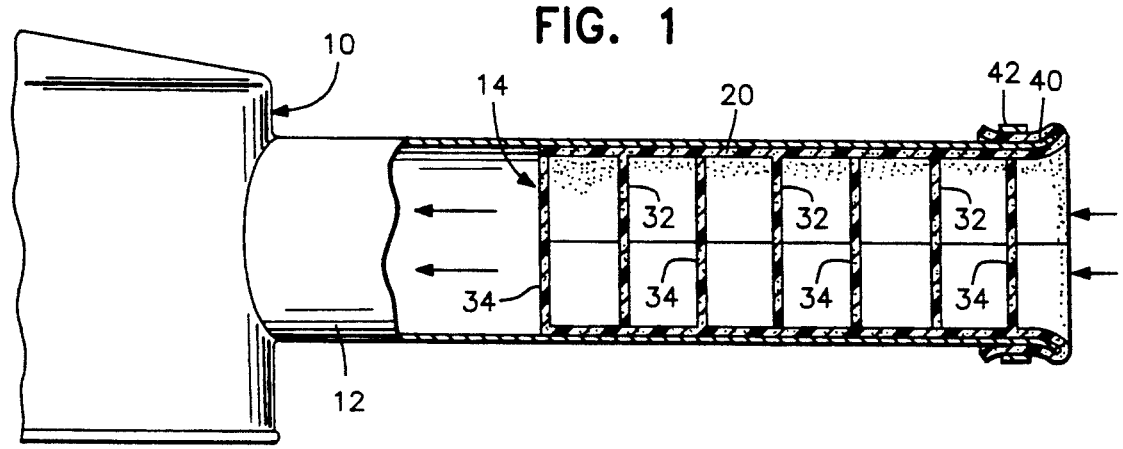
FIG. 1
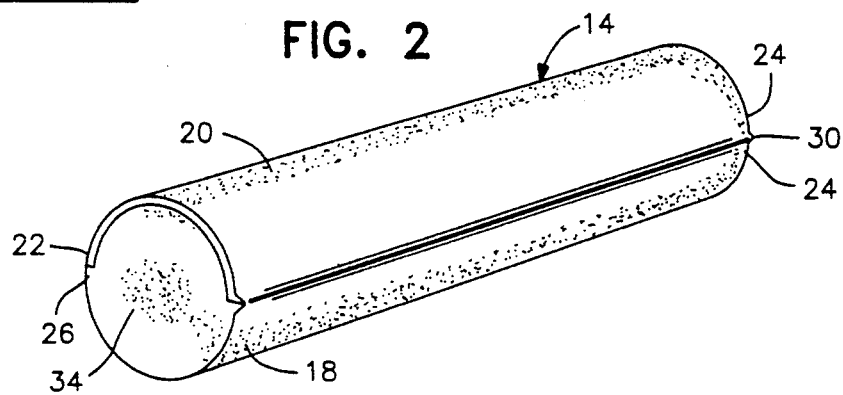
FIG. 2
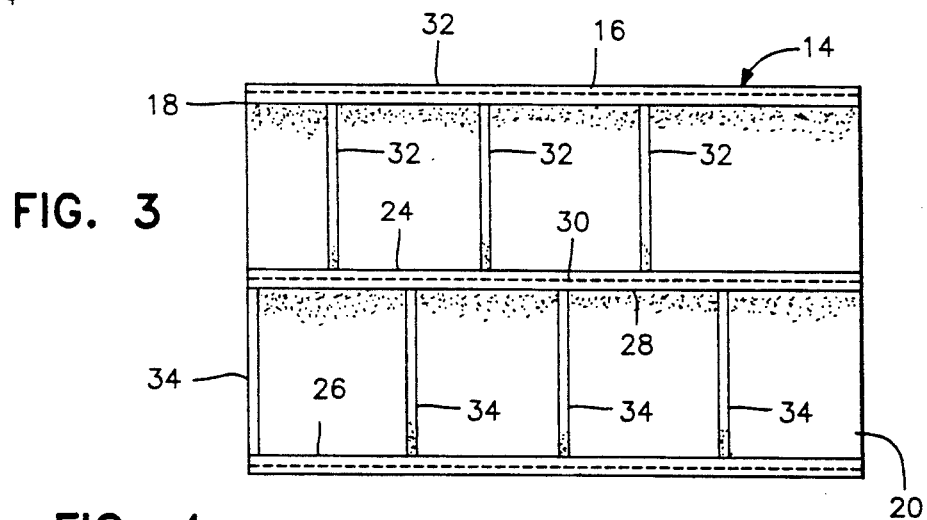
FIG. 3
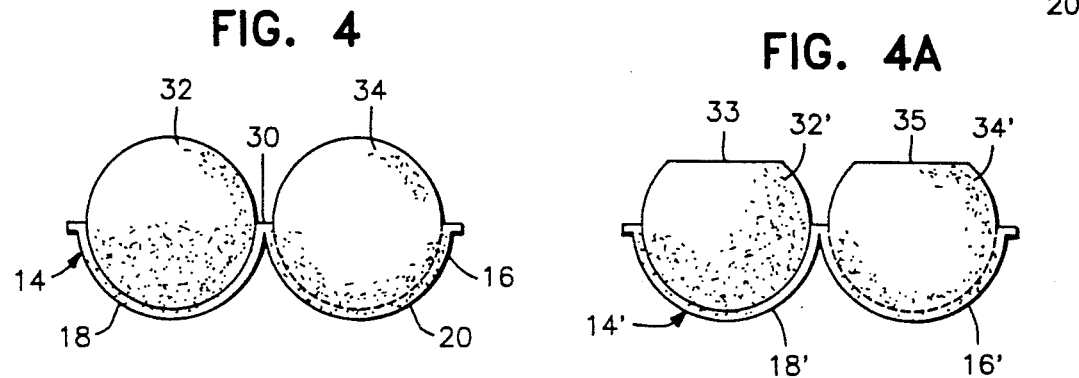
FIG. 4
FIG. 4A

CARBURETOR AIR FILTER

BACKGROUND OF THE INVENTION

1. Field of the Invention

This invention relates to an air filter construction specifically adapted to be utilized as a supplemental (or sole) air filter within the generally radially outwardly projecting snorkel tube of a conventional automotive air filter housing.

2. Description of Related Art

Various different forms of inline air filters heretofore have been provided including some of the general, structional and operational features of the instant invention. Examples of these previously known filters are disclosed in U.S. Pat. Nos. 4,137,647, 4,178,161, 4,312,648, 4,523,937, 4,597,781, 5,114,447 and 5,123,936.

However, these previously known filter do not include the overall combination of structural and operational features of the instant invention.

SUMMARY OF THE INVENTION

The air filter construction of the instant invention is specifically designed to be used within the generally cylindrical air snorkel tube of a conventional automotive air filter and is adapted to be used as a supplemental air filter or as the sole air filter.

The air filter is unique in that it may include as many transverse air filtering panels as desired and may be readily constructed in different sizes for use in conjunction with different size automotive air filter housing snorkels. Further, the air filter is also constructed in a manner such that insertion and removable of the air filter into and out of the air filter housing snorkel may be readily accomplished in a manner of seconds without removal of any portion of the associated air cleaner housing or air cleaner housing snorkel.

The main object of this invention is to provide an air cleaner for us in conjunction with the air inlet snorkel of conventional automotive type air cleaner housings.

Another object of this invention is to provide an air cleaner which may be readily constructed of different sizes for use in connection with different sized snorkels.

Still another important object of this invention is to provide an air filter in accordance with the preceding objects and which may include substantially any number of air filtering panel portions disposed transverse to the air flow through an air cleaner housing snorkel.

Another very important object of this invention is to provide an air cleaner which may be readily inserted into and securely mounted relative to or removed from an associated air cleaner housing air inlet snorkel in a manner of seconds without any disassembly of the air cleaner housing or the housing air inlet snorkel and without the use of tools.

A final object of this invention to be specifically enumerated herein is to provide an air cleaner in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 1 is a fragmentary side elevational view of a typical form of automotive air cleaner housing equipped with a generally radially outwardly projecting air inlet snorkel and with an air cleaner or air filter constructed in accordance with the present invention in operative association with the inlet and of the snorkel, portions of the snorkel and the air cleaner or filter being broken away and illustrated in longitudinal vertical section;

FIG. 2 is a perspective view of the air cleaner or filter as seen from the left side of FIG. 1;

FIG. 3 is a plan view of the air filter with the semicylindrical halves thereof, as manufactured, in their full open positions;

FIG. 4 is an end elevational view of the air cleaner or filter assembly illustrated in FIG. 3 and FIG. 4A is an end elevational view of a slightly modified form of the invention.

DESCRIPTION OF THE PREFERRED EMBODIMENT

Referring now more specifically to the drawings, the numeral 10 generally designates a conventional form of automotive air filter or cleaner housing including a generally radially outwardly extending inlet snorkel 12 which is usually open throughout its length.

The air filter or cleaner of the instant invention is referred to in general by the reference numeral 14 and includes a molded body 16 of open cell filter material with the body incorporating two elongated, upwardly opening and channel-shaped halves 18 and 20 each including opposite side upper marginal edges 22, 24 and 26 and 28 with the halves 18 and 20 disposed in side-by-side juxtaposed position with adjacent upper marginal edges 24 and 28 of adjacent halves 18 and 20 integrally formed and joined by a living hinge portion 30 extending at least substantially fully along the length of the channel-shaped halves 18 and 20.

The halves 18 and 20 are semi-cylindrical in configuration and include substantially constant thickness wall portions. Further, the half 18 includes integral circular partition disks 32 formed integrally therewith and projecting outwardly therefrom while the half 20 includes circular partition disks 34 of the same type. Of course, the partition disks 32 and 34 are also constructed of open cell polyurethane plastic filter material suitable for filtering air passing therethrough.

The air filter 14 is initially molded in the condition of illustrated in FIGS. 3 and 4. However, after construction, the halves 18 and 20 have their open sides folded toward each other about the living hinge 30 in order to form the cylindrical air filter illustrated in FIG. 4. Further, it may be noted from FIG. 3 of the drawings that the partitions or disks 32 and 34 are staggered relative to each other. One of the disks 34 is disposed at on end of the cylindrical air filter 14 while the other end of the cylindrical air filter 14 enjoys considerable axial spacing between the terminal end thereof and the first filter disk 34.

The air filter 14 is constructed such that when it is in the configuration thereof illustrated in FIG. 2 it will be telescopingly receivable within the inlet snorkel 12 with the left end of the air filter illustrated in FIG. 2 being the first inserted end thereof. Then, the opposite end of the air filter 14 is left projecting outwardly of the snorkel 12 and has its wall portions reversely turned back over the outer end 40 of the inlet snorkel 12 and tightly banded thereto through the use of an adjustable band 42 extending circumferentially about the reverse turned portion of the air filter 14, the air filter 14 not needing to be tightly received in the snorkel 12.

It thus may be seen that the air filter 14, when installed, defines seven transverse disks of air filtering material through which air passing through the inlet snorkel 12 to the air cleaner housing 10 must pass.

This type of supplemental air filter is very useful in dusty areas. Of course, the first transverse disk 34 inward of the outer end of the inlet snorkel 12 will trap the majority of dust entering the inlet snorkel 12. If this first disk becomes overly choked with filtered material, the air filter 14 may be removed and the first disk 34 may be removed and the air filter 14 may be reinstalled. Then, when the next disk 32 becomes choked with foreign material, the air filter 14 again may be removed and the first disk 32 may be cut away, still leaving three disks 34 and two disks 32. This may continue until perhaps only one disk 32 and one disk 34 remain before it is necessary to replace the supplemental air filter 14, it being understood that the air filter housing 10 may also contain an adequate air filter.

In this manner, operation of a motor vehicle in relatively dusty areas can be carried out with complete safety insofar as operation of the associated engine without ingesting air borne particles through its intake system and successive clogged disks 34 and 32 of the air filter 14 may be removed when desired until perhaps only one or two disks remain. This prevents the replacement air filter (not shown) within the air filter housing from having to be excessively frequently replaced while still insuring proper air filtration of intake air for a combustion engine. Of course, the air filter 14 may be readily mass produced at a cost which is only a fraction of the cost of the original equipment air filter contained within the air filter housing.

Referring now more specifically to FIG. 4A, a modified form of air filter is referred to in general by the reference numeral 14'. The various parts of the filter 14, which correspond to the above described parts of the filter 14 are designated by the same prime numerals. The only difference between the filter 14' and the filter 14 is that the partition disks 32' and 34' are cut off as at 33 and 35. Thus, when the air filter 14' is assembled in operative association with the inlet snorkel 12, the filter 14' is operable to pass slightly more air therethrough inasmuch as the cut off portions 33 and 35 define a serpentine passage through the air filter 14', but the air filtering capacity of the air filter 14' remains substantially the same, inasmuch as dirt entrained in the air passing the serpentine air passage of the air filter 14' is thrown outwardly onto adjacent partitioned disks 32' and 34' by centrifugal force.

In the event the air filter 14 or the air filter 14' is to be used as the sole air cleaner, the diameter of the housing 10 may be appreciably reduced to approximately the diameter of the air horn of the associated carburetor, thereby substantially reducing the plan area of a sheet metal housing closely overlying the attendant carburetor and adjacent engine surfaces to thereby allow considerably better dissipation of heat from the engine and to thereby substantially reduce the possibility of vapor locks.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An air filter for the inlet end of a tubular air intake, said air filter including a molded body of open cell air filtering material with said body including two elongated, upwardly opening channel-shaped halves including opposite side upper margins with said halves disposed in side-by-side juxtaposed position with adjacent upper marginal edges of adjacent halves integrally formed and joined by a living hinge portion of said material extending therealong, said channel-shaped halves including integral partitions spaced therealong and projecting outwardly of the open sides of said halves with the partitions also being constructed of said material and the partitions of one of said halves staggered along said one half relative to the partitions of the other half, said open sides of said halves being swung toward each other about said living hinge portion to form a circumferentially continuous tubular member with those portions of said partitions projecting outwardly of the open side of each of said halves snugly received in and including marginal contours at least substantially conforming to the inside cross sectional shape of the other half.

2. The air filter of claim 1 wherein said halves are semicylindrical in inside cross sectional shape and said partitions are circular.

3. The air filter of claim 2 wherein said partitions are disk-shaped and of substantial constant thickness.

4. The air filter of claim 1 wherein said partitions in each half equal at least three in number.

5. The air filter of claim 1 wherein said partitions are spaced from one set of corresponding ends of said channels.

6. The air filter of claim 1 including a cylindrical vehicle air cleaner intake snorkel, said halves being semi-cylindrical in outside and inside cross sectional shape and said partitions being generally circular in plan shape, said snorkel including an inlet end, said filter being telescoped into said inlet end with said one set of ends projecting outwardly therefrom and back turned over the exterior of said inlet end of said snorkel and secured thereto by a band secured circumferentially thereabout.

7. The air filter and air cleaner snorkel combination of claim 6 wherein said partitions are of substantially constant thickness.

8. The combination of claim 7 wherein said partitions in each half equal at least three in number.

9. The combination of claim 7 wherein said partitions are spaced from said one set of corresponding ends of said channels.

10. The air filter of claim 1 wherein said portions of said partitions are slightly abbreviated such that a slight air passage therepast is defined and said air filter thereby defines a serpentine air passage therethrough.

* * * * *